United States Patent [19]

Legerius et al.

[11] Patent Number: 4,712,342
[45] Date of Patent: Dec. 15, 1987

[54] FIRE-SEALED LEAD-THROUGH FOR FRAMED BUILDING COMPONENTS

[75] Inventors: Bengt E. Legerius; Inge Sundström, both of Nyköping, Sweden

[73] Assignee: Thorsman & Co. Aktiebolag, Nykoping, Sweden

[21] Appl. No.: 871,407

[22] PCT Filed: Sep. 27, 1985

[86] PCT No.: PCT/SE85/00373
§ 371 Date: May 19, 1986
§ 102(e) Date: May 19, 1986

[87] PCT Pub. No.: WO86/02119
PCT Pub. Date: Apr. 10, 1986

[30] Foreign Application Priority Data

Sep. 28, 1984 [SE] Sweden .................... 8404880

[51] Int. Cl.⁴ .................... E04F 17/08; E04B 5/48; F16L 5/02; H02G 3/22
[52] U.S. Cl. .................... 52/221; 52/743; 52/309.4; 52/396
[58] Field of Search .............. 52/221, 232, 743, 744, 52/573, 309.4, 396; 285/192; 169/43, 48; 138/89, 101

[56] References Cited

U.S. PATENT DOCUMENTS

| | | | |
|---|---|---|---|
| 3,894,131 | 7/1975 | Speech | 138/89 |
| 4,237,667 | 12/1980 | Pallucci | 52/221 |
| 4,244,484 | 1/1981 | Guritz | 52/221 |
| 4,302,917 | 12/1981 | Fermvik | 52/309.4 |
| 4,337,603 | 7/1982 | Davidson | 52/221 |
| 4,419,535 | 12/1983 | O'Hara | 52/232 |

Primary Examiner—John E. Murtagh
Attorney, Agent, or Firm—Roberts, Spiecens & Cohen

[57] ABSTRACT

Apparatus for the fire-sealing of a lead-through for at least one cable through a building framework comprising an inner pipe filled with precompressed elastic fire-resistant foam material and an outer pipe surrounding the inner pipe. The apparatus is mounted in a hole in the framework and the two pipes are connected to respective outer walls of the framework. Between the pipes there is a gap admitting relative movement of the pipes. The gap is sealed by the foam material filling the inner pipe and a portion of which extends into the outer pipe and presses against its inner surface.

8 Claims, 2 Drawing Figures

FIRE-SEALED LEAD-THROUGH FOR FRAMED BUILDING COMPONENTS

FIELD OF THE INVENTION

The invention relates to an apparatus for the fire-sealing of a lead-through for at least one cable or wire through a building component consisting of a framework having arranged on each side of it boards of a fireproof material, preferably plaster, said apparatus comprising an inner pipe, completely or partly filled with elastic fire-resistant foam material precompressed transversely to the longitudinal direction of the pipe, and an outer pipe partly surrounding the inner pipe and being displaceable relative to the inner pipe, the pipes, in the mounted position of the apparatus in a hole being made through the building component each, being intended to be connected at their outer end parts to an outer surface of the building component.

BACKGROUND

Several methods are known for fire-sealing lead-throughs for cables and/or wires through building components. Most of these methods have in common that they are preferably intended for walls of concrete. Usually these methods require a careful planning of the running of the cable and/or the wire, as these methods mean that complete lead-throughs or mounting frames for such are moulded onto the building components. In the cases when complete lead-throughs will be used for moulding, these are preferably made of a corrugated pipe covering of plastic which is filled with an elastic fire-resistant foam material. By means of a special tool, cables and/or wires are run through the foam, for example, according to the method which is described in Swedish patent No. 412 795.

According to another method, mounting frames are moulded into the building components as mentioned above. After the cables and/or wires have been run through the space in a frame this is filled with premanufactured fire-resistant pass pieces or with a fire-protective substance.

Also known are methods to achieve fire-proof lead-throughs in already existing moulded building components. In Swedish patent application No. 426 122 a method and an apparatus are described to place, in a hole made later in a building component, an elastic body of a fire-resistant foam material, said body having a considerably larger diameter than the hole. According to the patent application the body is compressed in the tool when being inserted in the hole and remains in place by compression transversely to the longitudinal direction of the hole, said compression being a condition for the intended functioning of the lead-through. Due to the high costs of the fire-resistant foam material, the body generally does not fill the whole length of the hole but the length of the body is adjusted to the fire class of the wall in question.

The fact that light building techniques are employed with increasing frequency and that fire classed partitions are made of a frame work of plates covered on either side with several layers of plaster board and having the space between the wall sides mostly filled with mineral wool, a need has arisen to be able to effectively fire-seal lead-throughs in such frame-work walls. None of the above mentioned known arrangements for lead-throughs can easily be placed in an optional position in a frame-work wall. To be able to place the lead-through in an optional position means that it does not have to be placed in connection to, and to be carried by, a latch or a nogging piece connecting the latches. This optional placing furthermore means that the lead-through will completely be carried by the surface covering of the wall, preferably made of plaster boards. When there is a fire, the plaster boards facing the fire center will successively be destroyed. In order to delay as much as possible this destruction due to the heating, it is important that the wall not be exposed to other strains than those caused directly by the fire. Due to the heating there are certain movements in the plaster boards, whereby a lead-through, which rigidly joins the two outer surfaces of the wall, can give rise to cracking of the plaster boards and rapid deterioration of the wall. Therefore, a lead-through must have a certain movability while when it is exposed to the heat from a fire-center it, must be tight and prevent hot fire-gases as well as poisonous and/or corrosive gases from the fire from passing through the lead-through.

SUMMARY OF THE INVENTION

An object of the invention is to provide an apparatus rendering possible a quick and simple mounting of a fire-sealed lead-through in a frame-work wall with a plaster board covering. According to the invention this is achieved by a premanufactured arrangement comprising two concentrically arranged pipes pushed into each other and placed in a hole made in the frame work wall, the free ends of the pipes each being connected to an outer surface of the frame work wall. The inner of the two pipes is completely or partly filled with an elastic fire-resistant foam material precompressed transversely to the longitudinal direction of the pipe. The arrangement is characterized in that the foam material filling the inner pipe in the mounted position of the arrangement partly extends into the outer pipe and presses against its inner surface and thus seals the gap between the two pipes.

DETAILED DESCRIPTION OF BEST MODE(S) FOR CARRYING OUT THE INVENTION

Figure 1:
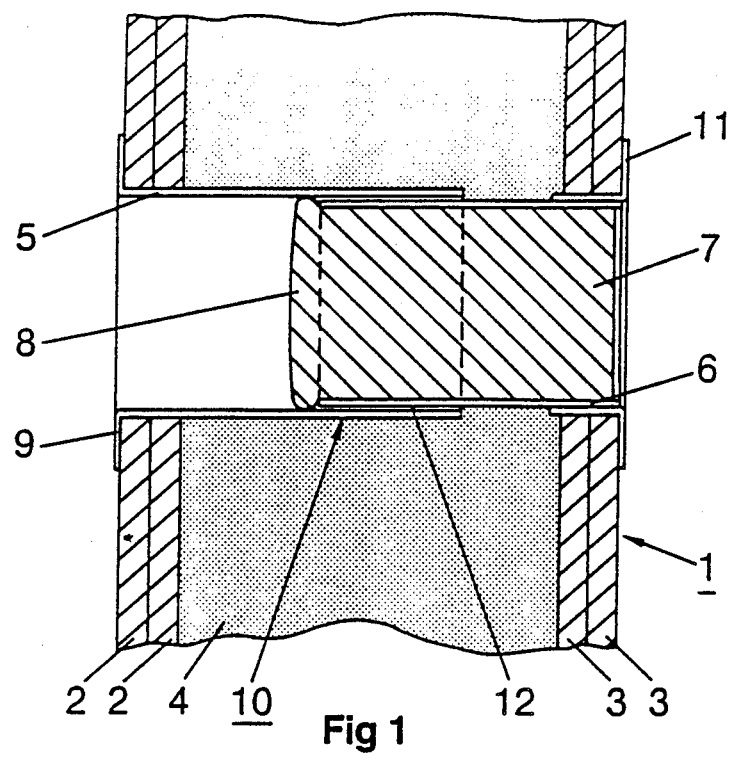
FIG. 1 is a sectional view which diagrammatically shows a first embodiment of an arrangement for the fire-sealing of a lead-through according to the invention and FIG. 2 shows a second embodiment of an arrangement for the fire-sealing of a lead-through according to the invention.

In FIG. 1, which in cross section shows a first embodiment of an arrangement of fire-sealing of a lead-through mounted in a wall, numeral 1 designates a part of a wall being built on latches (not shown), said wall comprising double wall boards 2, 3 on either side of the latches. The space between the boards is filled with an insulating material such as mineral wool 4. In the wall boards 2, 3 holes opposite each other are made. In the hole in the wall board 2 a lead-through 10 has been placed consisting of an outer pipe 5, an inner pipe 6 arranged in pipes, said pipe 6 being filled with an elastic fire-resistant foam material 7 precompressed transversely to the longitudinal direction of the pipe. One of the end parts of the outer pipe 5 has been formed with an outer flange 9, which has been fastened, in sealed manner, to the outer surface of the wall boards 2. In a start position the inner pipe 6 is fully inserted into the outer pipe 5, but after the lead-through 10 has been mounted in the wall boards 2 the inner pipe 6 is retracted until its free end part, through a screw, bayonet or similar socket connection has been joined to a flange 11 inserted from the outer side of the wall into the hole in the wall boards 3, said flange being sealingly fastened to the outer surface of the boards 3. In order to admit certain movements in the wall material caused by the heat, when there is a fire, and to facilitate the mounting of a lead-through into the wall, there is a gap 12 between the outer pipe 5 and the inner pipe 6. The gap 12 has been made fire-resistant and gas-sealing because a portion 8 of the foam material filling 7 in the inner pipe 6 extends into the outer pipe 5 and presses against its inner surface.

Figure 2:
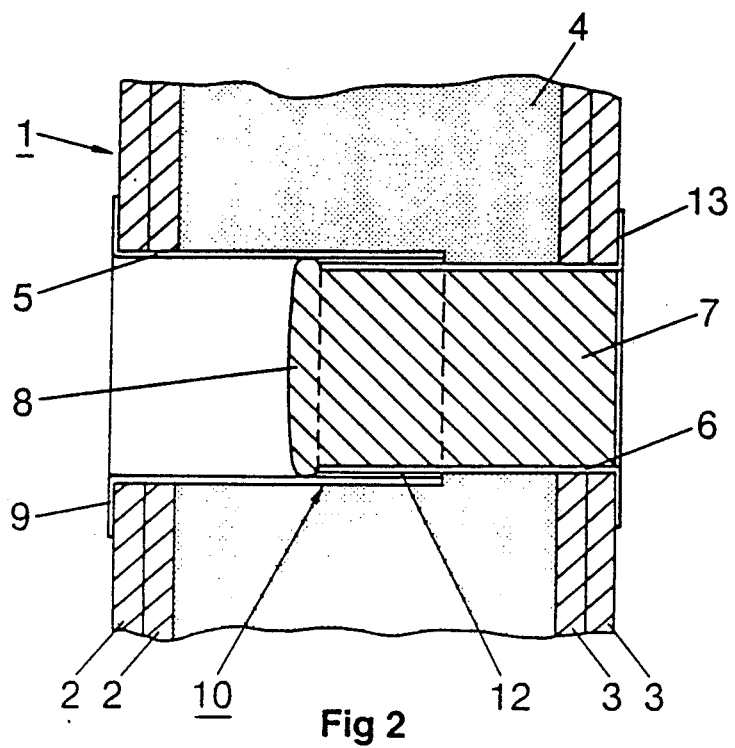

The embodiment shown in FIG. 2 differs from the embodiment shown in FIG. 1 only in that the inner pipe 6 is provided with an integral flange 13. Thus, the risk of possible gas leakage through the joint between the inner pipe 6 and the loose flange 11 has been eliminated. This embodiment requires a greater exactitude when mounting, because the entire inner pipe 6, with its precompressed foam material filling 7 must be fitted into the outer pipe 5 inside the wall. The fitting is made more difficult by the presence of the foam material part 8 which is expanding in free condition, which firstly must be inserted into the outer pipe 5, and against which it presses with the highest possible pressure. In order to prevent the part 8, when it is not surrounded by the outer pipe 5, from expanding so much that it is not easy to have it placed in its original position again, it is reinforced with a net of plastic or textile (not shown) which, when part 8 is reasonably expanded, is stretched and prevents further expansion without preventing the part 8 from pressing against the inner surface of the outer pipe 5 with full pressure when in the mounted position of the lead-through. Furthermore, the net is designed in such a manner that it does not prevent passage of the cable through the lead-through.

I claim:

1. A method of fire-sealing a lead-through for at least one cable or wire in the framework of a building comprised of two spaced walls, said method comprising
   forming a hole through the framework inclusive of aligned holes in the spaced walls,
   inserting through the hole in the framework a lead-through formed of an inner pipe containing an elastic, fire-resistant foam material precompressed transversely in the pipe and an outer pipe surrounding the inner pipe over a portion of the length of the inner pipe with a gap providing capability of relative axial displacement between the pipes,
   sealably connecting outer ends of the inner and outer pipes to respective walls of said framework such that the gap between the pipes permits relative movement of the walls, and
   sealing said gap during said movement by said foam material, a portion of which, extends out of the inner pipe and presses against the inner surface of the outer pipe while the remainder of the foam material remains in the inner pipe, under pressure, in sealed relation with the inner surface of the inner pipe.

2. A method as claimed in claim 1 wherein the outer ends of the inner and outer pipes are sealed to the walls at said aligned holes therein.

3. A method as claimed in claim 1 wherein during installation of the lead-through in the hole, the inner pipe is axially inserted fully into the outer pipe and is axially retracted from the outer pipe after the lead-through is inserted into said hole.

4. A fire-sealed lead-through for a least one cable or wire in the framework of a building comprised of two spaced walls, the framework having a hole therethrough extending through said walls, said lead-through comprising concentric inner and outer pipes, said outer pipe surrounding said inner pipe over a position of the length of the inner pipe and forming an annular gap therewith, means sealably connecting each of said pipes to a respective wall of the framework such that the gap between the pipes permits relative movement of the walls, and an elastic fire-resistant foam material filling said inner pipe and precompressed in the transverse direction of the pipe such that a portion of the foam material extends out of the inner pipe and presses against the inner surface of the outer pipe to seal said gap during relative movement of said pipes.

5. A lead-through as claimed in claim 4 wherein said foam material is reinforced to permit the inner and outer pipes to become separated and the inner pipe to be reinserted into the outer pipe.

6. A lead-through as claimed in claim 4 wherein said means which sealably connects each of the pipes to a respective wall of the framework comprises a flange for each pipe sealably secured to the respective said wall.

7. A lead-through as claimed in claim 6 wherein at least one of said flanges is integral with the respective pipe.

8. A lead-through as claimed in claim 4 wherein said foam material fills said inner pipe over substantially the entire axial length thereof.

* * * * *